(12) United States Patent
Kim

(10) Patent No.: US 12,485,961 B2
(45) Date of Patent: Dec. 2, 2025

(54) STEERING CONTROL APPARATUS OF SBW SYSTEM

(71) Applicants: Hyundai Motor Company, Seoul (KR); Kia Corporation, Seoul (KR)

(72) Inventor: Chan Jung Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 532 days.

(21) Appl. No.: 17/981,979

(22) Filed: Nov. 7, 2022

(65) Prior Publication Data

US 2023/0166791 A1  Jun. 1, 2023

(30) Foreign Application Priority Data

Nov. 30, 2021  (KR) .................. 10-2021-0167867

(51) Int. Cl.
*B62D 6/08* (2006.01)
*B62D 5/00* (2006.01)

(52) U.S. Cl.
CPC .............. *B62D 6/08* (2013.01); *B62D 5/006* (2013.01)

(58) Field of Classification Search
CPC .......... B62D 6/08; B62D 5/006; B62D 6/002; B62D 6/008; B62D 5/0421; B62D 5/0463
See application file for complete search history.

(56) References Cited

U.S. PATENT DOCUMENTS

| 6,097,286 A | * | 8/2000 | Discenzo | B62␣␣ 6/008 340/576 |
|---|---|---|---|---|
| 6,138,788 A | * | 10/2000 | Bohner | B62D 5/003 180/405 |
| 6,219,604 B1 | * | 4/2001 | Dilger | B62D 6/008 180/443 |
| 9,751,557 B2 | * | 9/2017 | Svensson | B62D 6/008 |
| 11,840,294 B2 | * | 12/2023 | Keßler | B62D 5/0457 |
| 2003/0141135 A1 | * | 7/2003 | Menjak | B62D 5/006 180/402 |
| 2003/0141136 A1 | * | 7/2003 | Menjak | B62D 5/001 180/402 |
| 2003/0169003 A1 | * | 9/2003 | Cao | B62D 6/008 318/432 |
| 2004/0168848 A1 | * | 9/2004 | Bohner | F16F 15/035 180/403 |
| 2006/0042858 A1 | * | 3/2006 | Boyle | B62D 5/092 180/402 |

(Continued)

*Primary Examiner* — S. Joseph Morano
(74) *Attorney, Agent, or Firm* — Morgan Lewis & Bockius LLP

(57) ABSTRACT

A steering feedback unit detects a steering torque generated according to an operation of a steering wheel, a road-wheel steering unit connected to the steering feedback unit to allow a steering of a wheel to be performed according to a steering angle or the steering torque transmitted from the steering feedback unit, and a control unit determines the steering torque detected in the steering feedback unit as a steering angle selectively according to a preset standard vehicle speed and standard steering speed to transmit the determined steering angle to the road-wheel steering unit, and controls the steering of the wheel according to the steering angle to be performed, or transmits the steering torque detected in the steering feedback unit to the road-wheel steering unit and control the amount of motor torque for the steering of the wheel to be determined.

8 Claims, 10 Drawing Sheets

(56) References Cited

U.S. PATENT DOCUMENTS

| | | | |
|---|---|---|---|
| 2006/0086560 A1* | 4/2006 | Furusho | B62D 5/0463 |
| | | | 180/446 |
| 2006/0200290 A1* | 9/2006 | Chino | B62D 6/008 |
| | | | 180/443 |
| 2008/0249685 A1* | 10/2008 | Hara | B62D 5/006 |
| | | | 701/42 |
| 2010/0211262 A1* | 8/2010 | Kushiro | B62D 6/008 |
| | | | 701/41 |
| 2019/0225261 A1* | 7/2019 | Kodera | B62D 5/0463 |
| 2020/0262468 A1* | 8/2020 | George | B60W 50/16 |
| 2020/0307690 A1* | 10/2020 | Carlsson | B62D 9/04 |
| 2022/0089212 A1* | 3/2022 | Klein | B62D 5/0463 |
| 2023/0166791 A1* | 6/2023 | Kim | B62D 5/006 |
| | | | 180/402 |

\* cited by examiner

STEERING CONTROL APPARATUS OF SBW SYSTEM

CROSS-REFERENCE TO RELATED APPLICATION

The present application claims priority to Korean Patent Application No. 10-2021-0167867 filed on Nov. 30, 2021, the entire contents of which is incorporated herein for all purposes by this reference.

BACKGROUND OF THE PRESENT DISCLOSURE

Field of the Present Disclosure

The present disclosure relates to a steering control apparatus of an SBW system, and more particularly, to a steering control apparatus of an SBW system, which performs a steering control based on a steering torque input area of an operation area, which frequently occurs.

Description of Related Art

In general, a vehicle steer-by-wire (SBW) system refers to a system that performs a vehicle steering using an electric motor such as a motor instead of removing a mechanical connection device such as a steering column, a universal joint, or a pinion shaft between a steering wheel and a wheel.

Because such a system does not have a mechanical connection between a steering rack gear and the steering column, it is necessary to generate an appropriate steering feedback from the motor provided on a handle upon steering for a driver to feel a steering feel similar to that of a conventional steering system.

In other words, a conventional SBW system generates a steering feedback torque through a steering feedback actuator (SFA), which is an upper stage control unit of the SBW, so that the driver holding the steering wheel may feel the steering feedback.

Here, the SBW system is composed of a steering wheel, a motor provided at one side of the steering wheel to provide a feedback torque according to the rotation of the steering wheel, a gearbox configured to perform a steering action by linearly moving a steering shaft, a plurality of sensors including a steering angle sensor configured to detect a torque change and a steering angle according to the rotation of the steering wheel, and a vehicle speed, and an electronic control unit (ECU) configured to operate the gearbox and a feedback motor according to an electric signal applied from the sensor.

Here, the motor is connected to the steering wheel and configured to generate a force in an opposite direction to the rotation of the steering wheel to give an appropriate steering feel to a driver, and the gearbox is connected to the steering shaft connected to both steering wheels and configured to linearly move the steering shaft.

According to the present structure, there is a problem in that the motor, the electronic control device, and the steering angle sensor are required to implement the conventional SFA system, and furthermore, a plurality of motors, electronic control devices, and steering angle sensors are required to satisfy the redundancy of the system, so that a material cost is inevitably increased.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a steering control apparatus of an SBW system, which may determine a steering torque through a steering feedback actuator as a steering angle according to a vehicle speed when a steering torque generated depending on a torsion angle of a torsion bar configuring a steering wheel is input, perform a steering control by transmitting the determined steering angle to a road-wheel steering actuator, or perform a steering control of the road-wheel steering actuator through the amount of motor torque determined by adding a motor torque to the steering torque transmitted from the steering feedback actuator, improving a steering feel and at the same time, securing hand-covered stability.

According to an aspect of the present disclosure, there is provided a steering control apparatus of an SBW system including: a steering feedback unit configured to detect a steering torque generated according to an operation of a steering wheel, a road-wheel steering unit connected to the steering feedback unit to allow a steering of a wheel to be performed according to the steering torque transmitted from the steering feedback unit, and a control unit configured to determine the steering torque detected in the steering feedback unit as a steering angle to transmit the determined steering angle to the road-wheel steering unit, and control the steering of the wheel according to the steering angle to be performed.

Here, the steering feedback unit includes: a torsion bar connected to the steering wheel, and configured to measure a torsion displacement and a torsion sensor including the torsion bar inserted therein, and configured to output the steering torque as corresponding to the torsion displacement as the steering wheel rotates.

Furthermore, the control unit is configured to apply the steering torque detected through the steering feedback unit to a plurality of steering auxiliary modules, is configured to control the steering torque to be processed, and applies the processed steering torque to a preset steering angle generation module so that the steering angle for being transmitted to the road-wheel steering unit is determined.

Furthermore, the steering angle generation module includes a first module in which the steering angle increases in proportion to an increase in the steering torque, a second module in which an increase rate of the steering angle gradually increase as the steering torque increases, and a third module in which the increase rate of the steering angle gradually decreases as the steering torque increases, and as at least any one steering angle generation module among the first, second, and third modules is selected, the control unit is configured to control different steering angles for the input steering torques to be determined.

The steering auxiliary module includes: at least one of a hysteresis generation module, a damping force generation module, and a restoring force generation module.

Meanwhile, according to another aspect of the present disclosure, there is provided a steering control apparatus of an SBW system including: a steering feedback unit configured to detect a steering torque generated according to an operation of a steering wheel, a road-wheel steering unit connected to the steering feedback unit to allow a steering of a wheel to be performed according to the steering torque transmitted from the steering feedback unit, and a control unit configured to transmit the steering torque detected in the steering feedback unit to the road-wheel steering unit to control the amount of motor torque for the steering of a wheel to be determined.

Here, the steering feedback unit includes: a torsion bar connected to the steering wheel, and configured to measure a torsion displacement and a torsion sensor including the torsion bar inserted therein, and configured to output the steering torque as corresponding to the torsion displacement as the steering wheel rotates.

Furthermore, the control unit is configured to apply the steering torque detected in the steering feedback unit and transmitted to the road-wheel steering unit to a preset steering torque generation module, and is configured to control the steering torque to be processed, and applies the processed steering torque to a plurality of steering auxiliary modules together to control the amount of motor torque to be determined.

Furthermore, the steering torque generation module includes a first module in which a motor torque increases in proportion to an increase in the steering torque, a second module in which an increase rate of the motor torque gradually increase as the steering torque increases, and a third module in which the increase rate of the motor torque gradually decreases as the steering torque increases, and as at least any one steering torque generation module among the first, second, and third modules is selected, the control unit is configured to control different motor torques for the input steering torques to be determined.

The steering auxiliary module includes: at least one of a hysteresis generation module, a damping force generation module, and a restoring force generation module.

According to an exemplary embodiment of the present disclosure, it is possible to determine a steering torque through a steering feedback actuator as a steering angle according to a vehicle speed when a steering torque generated depending on a torsion angle of a torsion bar configuring a steering wheel is input, perform a steering control by transmitting the determined steering angle to a road-wheel steering actuator, or perform a steering control of the road-wheel steering actuator through the amount of motor torque determined by adding a motor torque to the steering torque transmitted from the steering feedback actuator, improving a steering feel and at the same time, securing hand-covered stability.

Furthermore, according to an exemplary embodiment of the present disclosure, it is possible to remove the plurality of motors and the plurality of steering angle sensors included in the conventional SBW system, simplifying the structure and reducing the material cost accordingly.

Furthermore, according to an exemplary embodiment of the present disclosure, because the force of generating the steering torque is implemented by the rigidity of the torsion bar other than the assist through the motor included in the conventional SBW system, there is no limitation according to the input of the steering torque, so that it is possible to prevent the increase in the material cost for securing the capacity of the motor configured for the steering assist.

It is understood that the term "automotive" or "vehicular" or other similar term as used herein is inclusive of motor automotives in general such as passenger vehicles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

The above and other features of the present disclosure are discussed infra.

Figure 1:
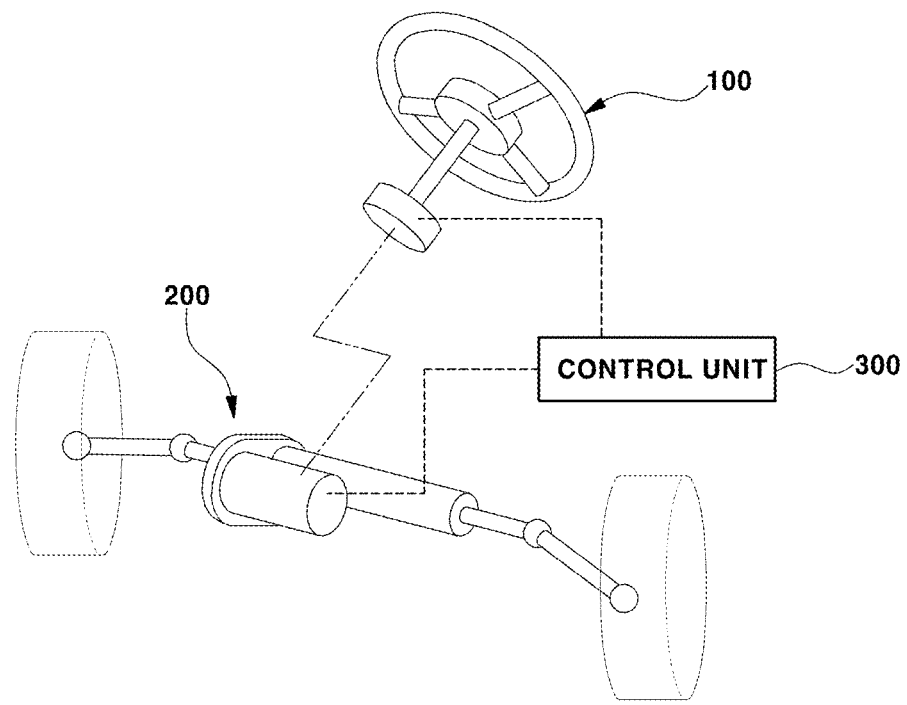
FIG. 1 is a view showing a structure of a steering control apparatus of an SBW system according to an exemplary embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in section by the particularly intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, exemplary embodiments of the present disclosure will be described in detail with reference to the accompanying drawings.

Advantages and features of the present disclosure and methods of achieving them will be made clear from embodiments described in detail below with reference to the accompanying drawings.

However, the present disclosure is not limited to various exemplary embodiments disclosed below but will be implemented in various different forms, and only these embodiments are provided so that the present disclosure of the present disclosure will be thorough and complete and will fully convey the scope of the present disclosure to those skilled in the art to which the present disclosure pertains, and the present disclosure is defined by the description of the claims.

Furthermore, in the description of the present disclosure, when it is determined that related known technologies may obscure the gist of the present disclosure, detailed description thereof will be omitted.

Figure 2A:
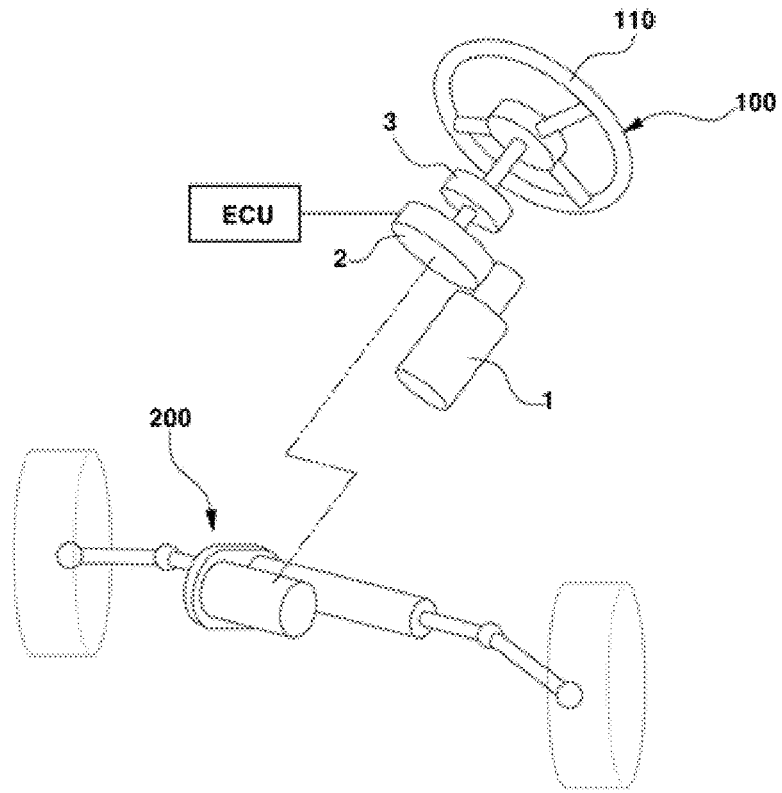
FIG. 2A and FIG. 2B are views showing a connection between a steering feedback actuator and a road-wheel steering actuator of a conventional SBW system.
Figure 2B:
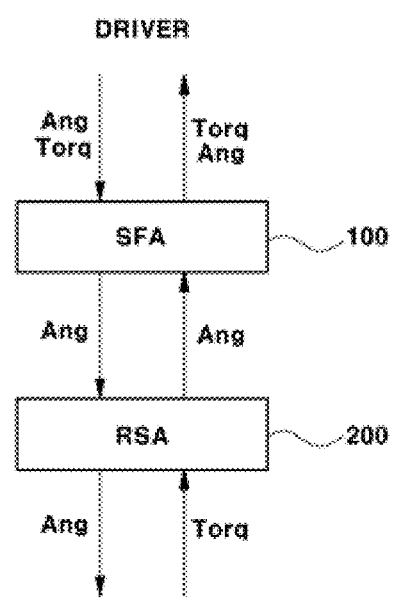

FIG. 1 is a view showing a structure of a steering control apparatus of an SBW system according to an exemplary embodiment of the present disclosure, and FIG. 2A and FIG. 2B are views showing a connection between a steering feedback actuator and a road-wheel steering actuator of a conventional SBW system.

Figure 3:
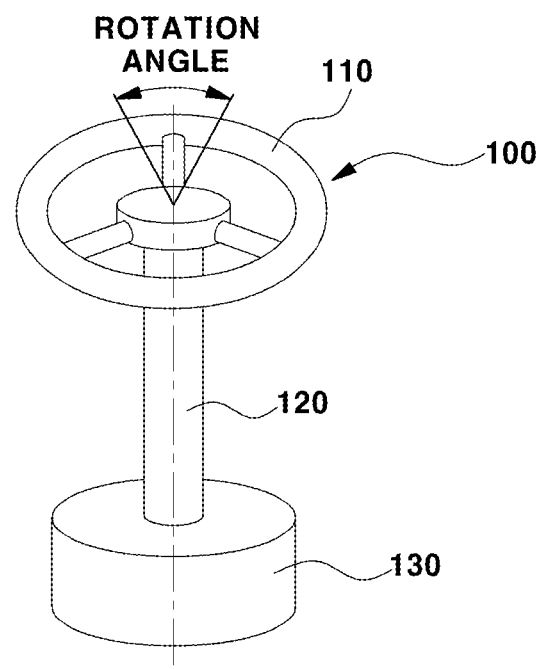
FIG. 3 is a view showing a steering feedback unit of the steering control apparatus of the SBW system according to an exemplary embodiment of the present disclosure.
Figure 4:
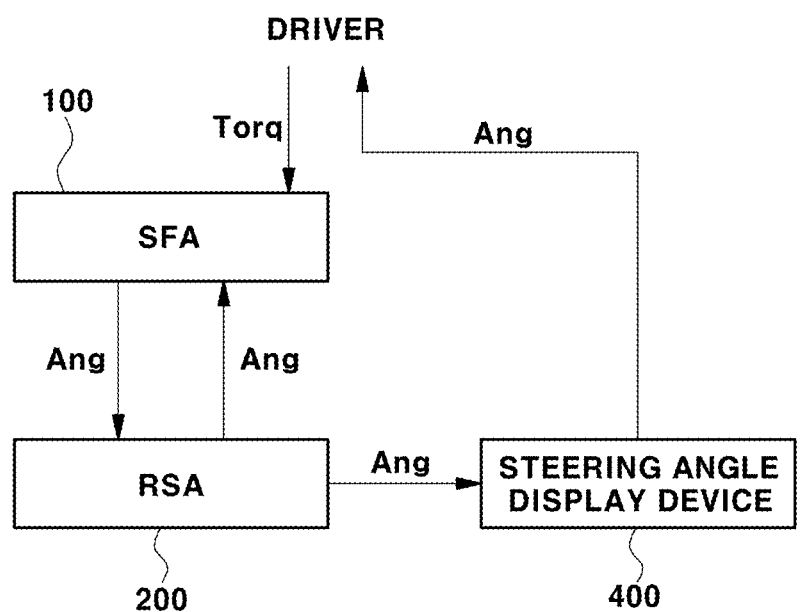
FIG. 4 is a view showing a control of a steering feedback unit and a road-wheel steering unit of the steering control apparatus of the SBW system according to an exemplary embodiment of the present disclosure.
Figure 5:
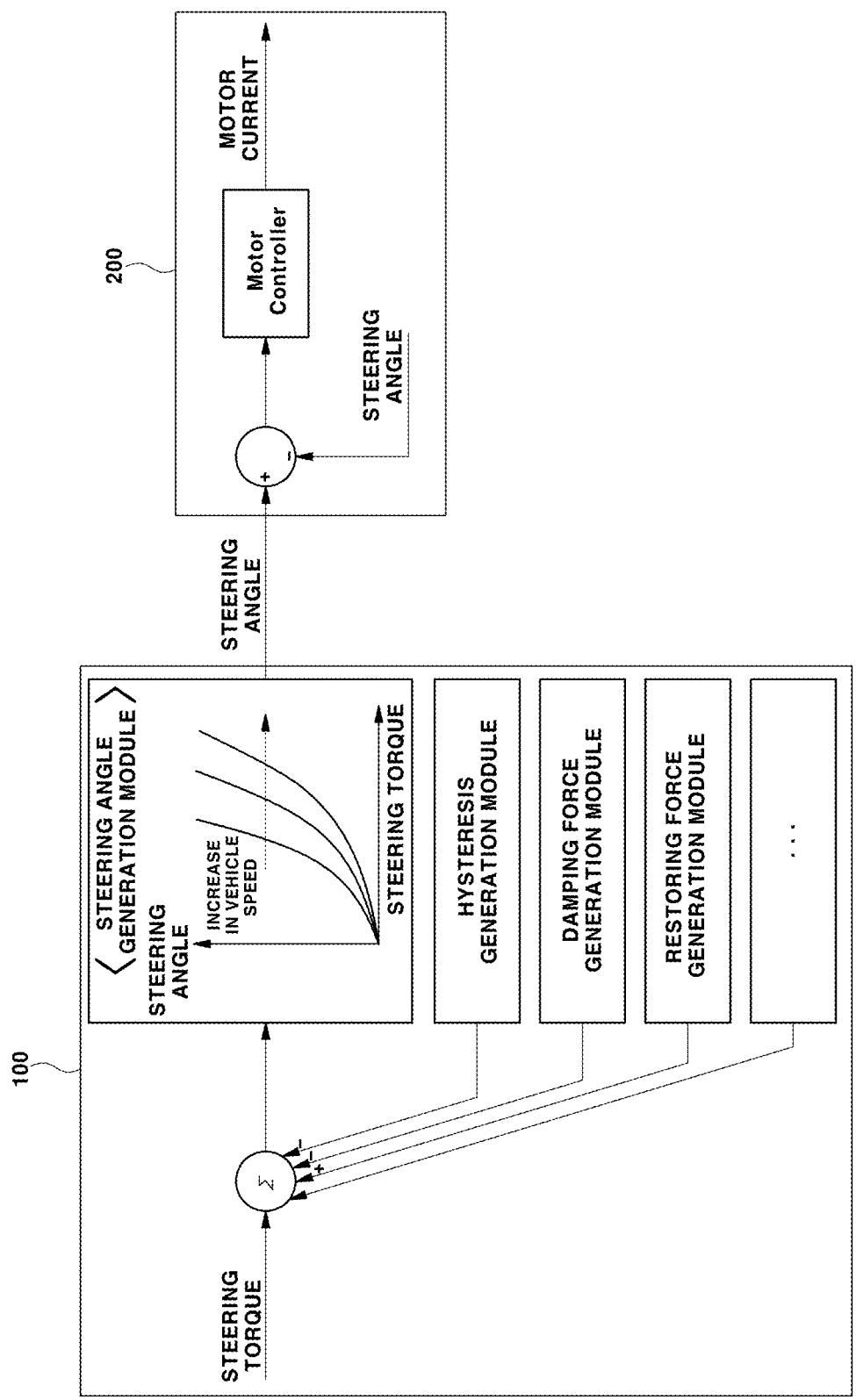
FIG. 5 is a view showing various exemplary embodiments of a control unit of the steering control apparatus of the SBW system according to an exemplary embodiment of the present disclosure.

FIG. 3 is a view showing a steering feedback unit of the steering control apparatus of the SBW system according to an exemplary embodiment of the present disclosure, FIG. 4 is a view showing a control of a steering feedback unit and a road-wheel steering unit of the steering control apparatus of the SBW system according to an exemplary embodiment of the present disclosure, FIG. 5 is a view showing various exemplary embodiments of a control unit of the steering control apparatus of the SBW system according to an exemplary embodiment of the present disclosure.

Figure 6A:
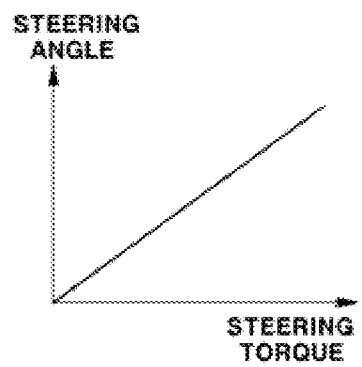
FIG. 6A, FIG. 6B and FIG. 6C are views showing first, second, and third modules in the various exemplary embodiments of the control unit of the steering control apparatus of the SBW system according to an exemplary embodiment of the present disclosure.
Figure 6B:
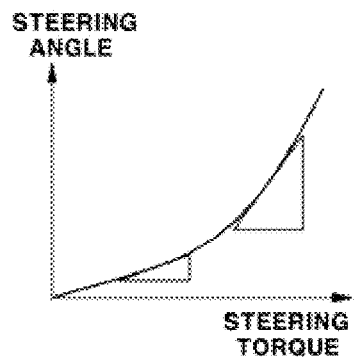
Figure 6C:
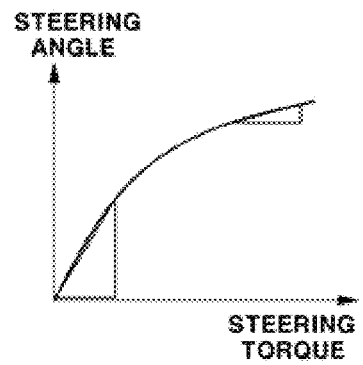
Figure 7:
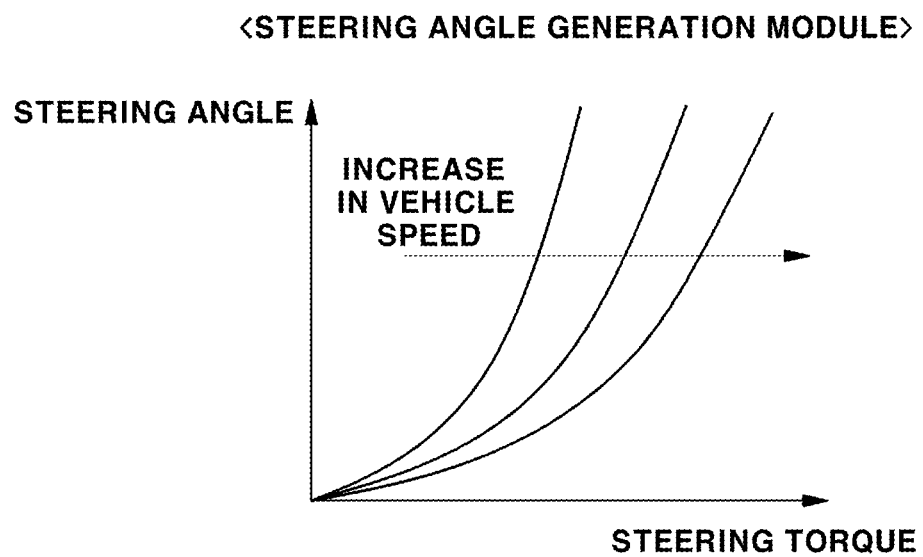
FIG. 7 is a view showing a steering angle generation module in the various exemplary embodiments of the control unit of the steering control apparatus of the SBW system according to an exemplary embodiment of the present disclosure.
Figure 8:
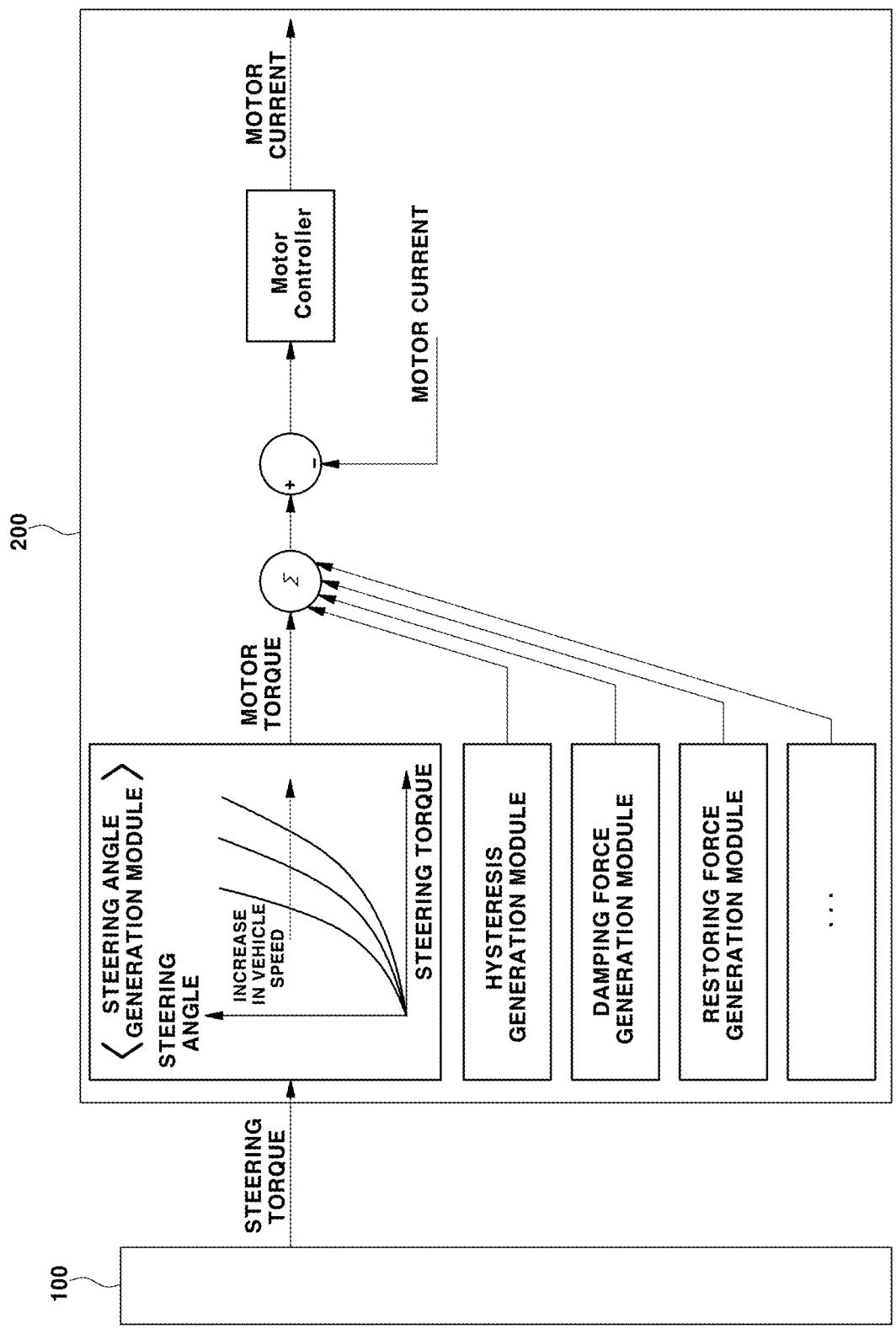
FIG. 8 is a view showing various exemplary embodiments of the control unit of the steering control apparatus of the SBW system according to an exemplary embodiment of the present disclosure.

FIG. 6A, FIG. 6B and FIG. 6C are views showing first, second, and third modules in the various exemplary embodiments of the control unit of the steering control apparatus of the SBW system according to an exemplary embodiment of the present disclosure, FIG. 7 is a view showing a steering angle generation module in the various exemplary embodiments of the control unit of the steering control apparatus of the SBW system according to an exemplary embodiment of the present disclosure, and FIG. 8 is a view showing various exemplary embodiments of the control unit of the steering control apparatus of the SBW system according to an exemplary embodiment of the present disclosure.

Figure 9A:
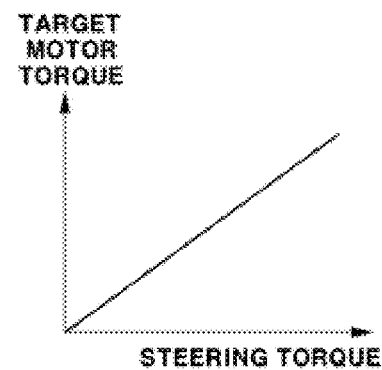
FIG. 9A, FIG. 9B and FIG. 9C are views showing first, second, and third modules in the various exemplary embodiments of the control unit of the steering control apparatus of the SBW system according to an exemplary embodiment of the present disclosure.
Figure 9B:
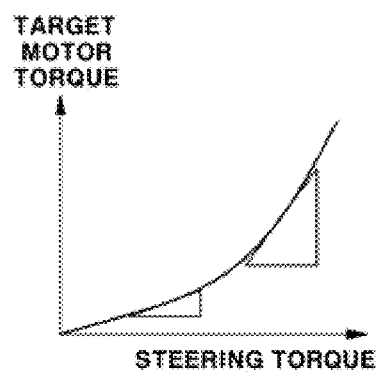
Figure 9C:
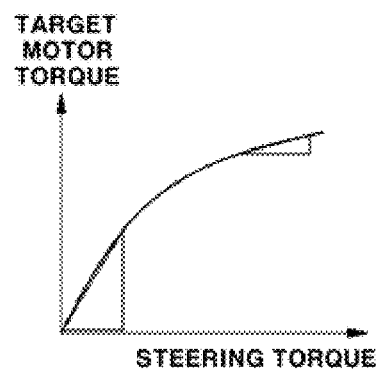
Figure 10:
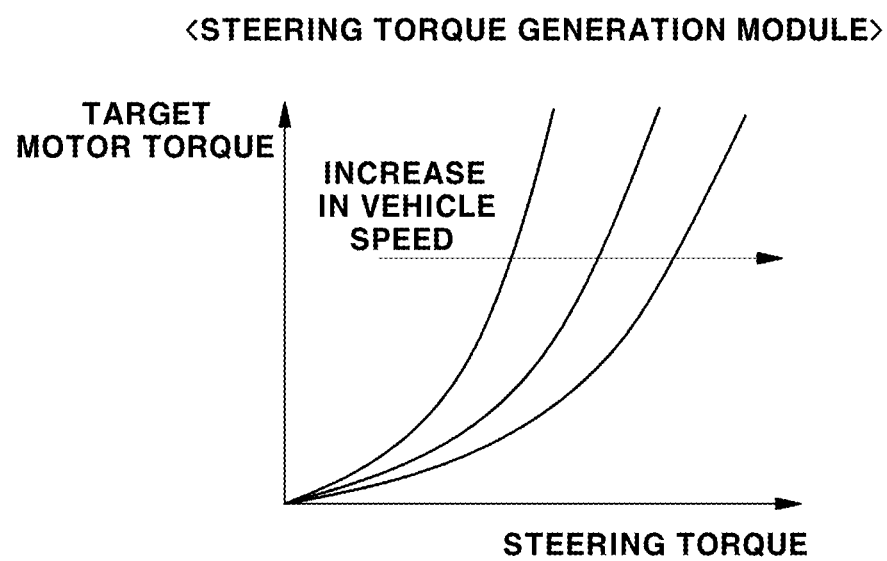
FIG. 10 is a view showing a steering torque generation module in the various exemplary embodiments of the control unit of the steering control apparatus of the SBW system according to an exemplary embodiment of the present disclosure.

FIG. 9A, FIG. 9B and FIG. 9C are views showing first, second, and third modules in the various exemplary embodiments of the control unit of the steering control apparatus of the SBW system according to an exemplary embodiment of the present disclosure, and FIG. 10 is a view showing a steering torque generation module in the various exemplary embodiments of the control unit of the steering control apparatus of the SBW system according to an exemplary embodiment of the present disclosure.

As shown in FIG. 1, a steering control apparatus of an SBW system according to the present exemplary embodiment includes a steering feedback unit 100, a road-wheel steering unit 200, and a control unit 300.

The steering feedback unit 100 detects a steering torque generated upon operation as a steering wheel 110 receiving a torque input from a driver is operated.

As shown in FIG. 3, the steering feedback unit 100 is provided with a torsion bar 120 and a torsion sensor 130.

The torsion bar 120 is connected to the steering wheel 110, and measures its torsional displacement as the steering wheel 110 is rotated.

Furthermore, the torsion sensor 130 has the torsion bar 120 inserted therein, and outputs the steering torque as corresponding to the torsion displacement as the steering wheel rotates.

Here, the torsion bar 120 is not much rotated differently from a conventional steering angle-based structure, and may be rotated only to the extent that the torsion sensor 130 receives the steering torque by the torsion bar 120.

For example, when the maximum torque transmitted to the driver is 30 Nm and a torsion bar constant of the torsion bar 120 is 5 Nm/deg, the torsion bar is rotated by only 6°, and thus because it is possible to remove the steering angle sensor and a bearing for rotation included in the conventional SBW system related to the rotation, facilitating a structural reduction, for example, the deformation to a structure of a shape such as a rotation knob may be possible.

In other words, conventionally, as shown in FIG. 2A, a motor 1, a deceleration gear 2, a control unit (ECU), and a steering sensor 3 are essential as a configuration of a steering feedback actuator (SFA), and as shown in FIG. 2B, the conventional SBW system including the present configuration, the driver gives a command of the steering angle or the steering torque to the steering feedback actuator (SFA), and conversely, the drive receives the output as the steering torque or the steering angle.

At the present time, because the steering feedback actuator (SFA) is configured to transmit the command of the steering angle to a road-wheel steering actuator (RSA), and receive a current location of a tire angle from the road-wheel steering actuator (RSA), and then the road-wheel steering actuator (RSA) is configured to give the steering angle to a tire (road surface), and receive a force from the tire (road surface), as a result, the conventional SBW system includes a configuration for satisfying the steering angle and the steering torque. Accordingly, in terms of the structural aspect, the configuration inevitably increases, and may be structurally complicated.

As a result, in the present exemplary embodiment of the present disclosure, based on a torque input area of an operation area, which frequently occurs, the driver inputs the steering angle as the steering torque, and receives the steering angle from the steering feedback actuator to adjust the steering angle (see FIG. 2B), that is, a design is conducted based on the steering torque input from the driver, so that a separate rotation shaft is not required because only the steering torque needs to be generated, removing the rotation structure of the motor 1 and the steering wheel in the conventional structure.

As described above, in the present exemplary embodiment of the present disclosure, as shown in FIG. 4, when the steering torque according to the operation of the steering wheel 110 is transmitted to the steering feedback unit 100, the steering feedback unit 100 determines and transmits the steering torque or the steering angle of the driver to the road-wheel steering unit 200, and based on the signal, the road-wheel steering unit 200 transmits the corresponding steering angle to the steering feedback unit 100 and a steering angle display device 400 with the steering of the tire.

As described above, by determining the steering torque detected by the steering feedback unit 100 as the steering angle to transmit the determined steering angle to the road-wheel steering unit 200, and performing the steering of the tire according to the determined steering angle (first control), or transmitting the steering torque detected by the steering feedback unit 100 to the road-wheel steering unit 200, and controlling the amount of the motor torque for the steering of the tire to be determined based on the steering torque (second control) according to the type of signal that the road-wheel steering unit 200 receives from the steering feedback unit 100, a steering control method may be selectively determined differently.

In other words, as shown in FIG. 5, the control unit 300 determines the torque detected through the torsion bar 110 and the torsion sensor 120 in the steering feedback unit 100 as the steering angle to transmit the determined steering angle to the road-wheel steering unit 200, and is configured to control the steering of the tire according to the steering angle to be performed.

Here, the control unit 300 applies the steering torque detected through the steering feedback unit 100 to the plurality of steering auxiliary modules, is configured to control a processing of the steering torque to be performed, and applies the processed steering torque to a preset steering angle generation module so that the steering angle to be transmitted to the road-wheel steering unit 200 is determined.

The control unit 300 inputs the steering torque of the driver to the plurality of steering auxiliary modules including a hysteresis generation module, a damping force generation module, and a restoring force generation module, and adds or subtracts the value of the steering torque, which is determined by being input to each of the steering auxiliary modules, to or from the steering torque of the driver before being input to the steering angle generation module so that the driver may feel a virtual steering torque when the driver operates the steering wheel 110 to generate the above result as the value of the steering torque for being input to the steering angle generation module.

The steering angle generation module may include a first module in which the steering angle increases in proportion to an increase in the steering torque as shown in FIG. 6A, a second module in which an increase rate of the steering angle gradually increase as the steering torque increases as shown in FIG. 6B, and a third module in which the increase rate of the steering angle gradually decreases as the steering torque increases as shown in FIG. 6C.

At the present time, as the steering angle generation module of at least one of the first, second, and third modules is selected from the driver, different steering angles for the input steering torque are determined, that is, as shown in FIG. 7, in general, the steering angle generation module is configured so that the steering angle for the same steering torque is decreased to secure stability of a vehicle when a vehicle speed is increased, and the control unit 300 is configured to control the steering angle generation module to be replaced with any one of the first, second, and third modules according to the driver's request so that the steering angle processed by the corresponding characteristic is determined.

Furthermore, the hysteresis module among the plurality of steering auxiliary modules configured to allow the driver to feel the virtual steering torque is a module configured to help not to change the steering angle according to the torque change when the steering is maintained when a vehicle is cornering, and a width of the hysteresis may be set by tuning.

For example, as the thus set width of the hysteresis increases, the steering angle is not changed by the driver's torque change, which may give the sense of safety to the driver when a vehicle travels straightly or is cornering, but when the width is excessively large, the driver may feel the delay of the steering angle when a direction of the steering torque is changed, so that the width is set to maintain an appropriate balance.

Furthermore, the damping force generation module among the plurality of steering auxiliary modules is a module configured to help the input steering torque to be controlled as if a virtual damping force exists to improve hand-covered stability or the like, and the restoring force generation module and the like is also disclosed, but the plurality of steering auxiliary modules merely correspond to any an exemplary embodiment and are not determined, and it is possible to perform a tuning for the steering torque to which other types of the steering auxiliary modules are applied and input.

As a result, by transmitting the steering angle determined in the steering feedback unit 100 to the road-wheel steering unit 200 to control the steering of the tire according to the steering angle to be performed in the above method, it is possible to improve the steering feel and at the same time, secure hand-covered stability even when the rotation structure of the motor, the bearing, etc. In the convention SBW system is removed.

Meanwhile, as shown in FIG. 8, the control unit 300 transmits the steering torque detected through the torsion bar 110 and the torsion sensor 120 of the steering feedback unit 100 to the road-wheel steering unit 200 as it is, and is configured to control the amount of motor torque for the steering of the tire to be determined.

In other words, the control unit 300 applies the steering torque measured and output through the torsion bar 110 and the torsion sensor 120 and transmitted to the road-wheel steering unit 200 to the preset steering torque generation module to control the steering torque to be processed, and applies the processed steering torque to the plurality of steering auxiliary modules together to control the amount of motor torque to be determined, and as a result, determines the motor torque according to the steering torque generated by the user through the steering torque generation module, and adds the steering torques (assist) determined through the plurality of steering auxiliary modules to the present motor torque to control the tire to be rotated by the amount of motor torque.

Here, the steering torque generation module may include a first module in which a target motor torque used for steering control increases in proportion to an increase in the steering torque as shown in FIG. 9A, a second module in which an increase rate of the target motor torque gradually increase as the steering torque increases as shown in FIG. 9B, and a third module in which the increase rate of the target motor torque gradually decreases as the steering torque increases as shown in FIG. 9C.

At the present time, as the steering torque generation module of at least one of the first, second, and third modules is selected by the driver, different motor torques for the input steering torque are determined, that is, as shown in FIG. 10, in general, the steering torque generation module is configured so that the target torque for the same steering torque is decreased to secure stability of a vehicle when a vehicle speed is increased, and the control unit 300 is configured to control the steering torque generation module to be replaced with any one of the first, second, and third modules according to the driver's request so that the motor torque processed by the corresponding characteristic is determined.

Here, in allowing the steering torque determined in the plurality of steering auxiliary modules to be operated with the motor torque determined through the steering torque generation module, for example, when the motor torque for assist is generated by use of the hysteresis module, the damping force generation module, and the restoring force generation module corresponding to the steering auxiliary module, the generated motor torque is operated with the motor torque determined through the steering torque generation module, so that the steering is performed with the amount of the corresponding motor torque.

Here, the hysteresis module, the damping force generation module, and the restoring force generation module are the same as those in the above-described embodiment, and the plurality of steering auxiliary modules also correspond to only any an exemplary embodiment and are not determined, and the assist for the motor torque to which other types of steering auxiliary modules are applied and which is input may be performed.

According to an exemplary embodiment of the present disclosure, it is possible to determine a steering torque through a steering feedback actuator as a steering angle according to a vehicle speed when a steering torque generated depending on a torsion angle of a torsion bar configuring a steering wheel is input, perform a steering control by transmitting the determined steering angle to a road-wheel steering actuator, or perform a steering control of the road-wheel steering actuator through the amount of motor torque determined by adding a motor torque to the steering torque transmitted from the steering feedback actuator, improving a steering feel and at the same time, securing hand-covered stability.

Furthermore, according to an exemplary embodiment of the present disclosure, it is possible to remove the plurality of motors and the plurality of steering angle sensors included in the conventional SBW system, simplifying the structure and reducing the material cost accordingly.

Furthermore, according to an exemplary embodiment of the present disclosure, because the force of generating the steering torque is implemented by the rigidity of the torsion bar other than the assist through the motor included in the conventional SBW system, there is no limitation according to the input of the steering torque, so that it is possible to prevent the increase in the material cost for securing the capacity of the motor for the steering assist.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A steering control apparatus of a vehicle steer-by-wire (SBW) system, the steering control apparatus comprising:
a steering feedback unit configured to detect a steering torque generated according to an operation of a steering wheel;
a road-wheel steering unit connected to the steering feedback unit to allow a steering of a wheel to be performed according to the steering torque transmitted from the steering feedback unit; and
a control unit connected to the steering feedback unit and the road-wheel steering unit and configured to determine and convert the steering torque detected in the steering feedback unit into a steering angle, which is then transmitted to the road-wheel steering unit, and control the steering of the wheel according to the steering angle to be performed,
wherein the control unit is configured to apply the steering torque detected through the steering feedback unit to a plurality of steering auxiliary modules, to control the steering torque to be processed, and to apply the processed steering torque to a preset steering angle generation module so that the steering angle for being transmitted to the road-wheel steering unit is determined, and
wherein the steering angle generation module includes a first module in which the steering angle increases in proportion to an increase in the steering torque, a second module in which an increase rate of the steering angle increase as the steering torque increases, and a third module in which the increase rate of the steering angle decreases as the steering torque increases.

2. The steering control apparatus of claim 1, wherein the steering feedback unit includes:
a torsion bar connected to the steering wheel, and configured to measure a torsion displacement; and
a torsion sensor including the torsion bar inserted therein, and configured to output the steering torque as corresponding to the torsion displacement as the steering wheel rotates.

3. The steering control apparatus of claim 1,
wherein the control unit is configured to control different steering angles for input steering torques to be determined as at least one steering angle generation module among the first, second, and third modules is selected.

4. The steering control apparatus of claim 1,
wherein the steering auxiliary modules include a hysteresis generation module, a damping force generation module, and a restoring force generation module.

5. A steering control apparatus of a vehicle steer-by-wire (SBW) system, the steering control apparatus comprising:
a steering feedback unit configured to detect a steering torque generated according to an operation of a steering wheel;
a road-wheel steering unit connected to the steering feedback unit to allow a steering of a wheel to be performed according to the steering torque transmitted from the steering feedback unit; and
a control unit connected to the steering feedback unit and the road-wheel steering unit and configured to transmit the steering torque detected in the steering feedback unit to the road-wheel steering unit to control an amount of motor torque for the steering of the wheel to be determined,
wherein the control unit is configured to apply the steering torque detected in the steering feedback unit and transmitted to the road-wheel steering unit to a preset steering torque generation module, and is configured to control the steering torque to be processed, and applies the processed steering torque to a plurality of steering auxiliary modules together to control the amount of the motor torque to be determined, and
wherein the steering torque generation module includes a first module in which the motor torque increases in proportion to an increase in the steering torque, a second module in which an increase rate of the motor torque increase as the steering torque increases, and a third module in which the increase rate of the motor torque decreases as the steering torque increases.

6. The steering control apparatus of claim 5, wherein the steering feedback unit includes:
a torsion bar connected to the steering wheel, and configured to measure a torsion displacement; and
a torsion sensor including the torsion bar inserted therein, and configured to output the steering torque as corresponding to the torsion displacement as the steering wheel rotates.

7. The steering control apparatus of claim 5,
wherein the control unit is configured to control different steering angles for input steering torques to be determined as at least one steering angle generation module among the first, second, and third modules is selected.

8. The steering control apparatus of claim 5,
wherein the plurality of steering auxiliary modules includes a hysteresis generation module, a damping force generation module, and a restoring force generation module.

* * * * *